(12) United States Patent
Joshi et al.

(10) Patent No.: US 11,193,913 B2
(45) Date of Patent: Dec. 7, 2021

(54) METHODS AND SYSTEMS TO DETECT SUB-SURFACE DEFECTS IN ELECTRONICS MODULES USING SHEAR FORCE MICROSCOPY

(71) Applicants: Toyota Motor Engineering & Manufacturing North America, Inc., Plano, TX (US); The Ohio State University, Columbus, OH (US)

(72) Inventors: Shailesh N. Joshi, Ann Arbor, MI (US); Vishnu Baba Sundaresan, Columbus, OH (US); Vijay Venkatesh, Columbus, OH (US)

(73) Assignees: TOYOTA MOTOR ENGINEERING & MANUFACTURING NORTH AMERICA, INC., Plano, TX (US); THE OHIO STATE UNIVERSITY, Columbus, OH (US)

( * ) Notice: Subject to any disclaimer, the term of this patent is extended or adjusted under 35 U.S.C. 154(b) by 48 days.

(21) Appl. No.: 16/778,791

(22) Filed: Jan. 31, 2020

(65) Prior Publication Data
US 2021/0239653 A1 Aug. 5, 2021

(51) Int. Cl.
*G01N 29/34* (2006.01)
*G01N 29/04* (2006.01)
*G01N 29/06* (2006.01)

(52) U.S. Cl.
CPC ....... *G01N 29/0681* (2013.01); *G01N 29/043* (2013.01); *G01N 29/34* (2013.01)

(58) Field of Classification Search
CPC ............................. G01N 29/0681; G01N 29/34
USPC ........................................................... 73/778
See application file for complete search history.

(56) References Cited

U.S. PATENT DOCUMENTS

| 5,412,980 | A | 5/1995 | Elings et al. |
| 7,285,963 | B2 | 10/2007 | Talanov et al. |
| 7,360,404 | B2* | 4/2008 | Reinstadtler ........... G01Q 60/28 73/105 |
| 7,448,269 | B2* | 11/2008 | Shekhawat ........ G01N 29/0663 181/101 |
| 7,550,963 | B1 | 6/2009 | Xiang et al. |

(Continued)

FOREIGN PATENT DOCUMENTS

JP 2004257973 A 9/2004

OTHER PUBLICATIONS

Seo, Yongho et al., "Fast-scanning shear-force microscopy using a high-frequency dithering probe", Applied Physics Letters, Dec. 25, 2000, p. 4274-4276, vol. 77, No. 26.

(Continued)

*Primary Examiner* — Jacques M Saint Surin
(74) *Attorney, Agent, or Firm* — Dinsmore & Shohl LLP (57) ABSTRACT

A method of detecting sub-surface voids in a sample comprises positioning a probe adjacent to a first point on the sample, emitting an ultrasonic wave from the probe towards the sample, moving the probe towards the sample, measuring a shear force amplitude of a reflection of the ultrasonic wave at the probe as the probe moves towards the sample, creating an approach curve by plotting the measured shear force amplitude of the reflection of the ultrasonic wave as a function of a distance between the probe and the sample, and determining whether a sub-surface void exists at the first point on the sample based on a slope of the approach curve.

20 Claims, 7 Drawing Sheets

(56) References Cited

U.S. PATENT DOCUMENTS

| | | |
|---|---|---|
| 8,037,762 B2 | 10/2011 | La Rosa Flores et al. |
| 8,689,359 B2 | 4/2014 | Rangelow et al. |
| 9,453,857 B2 | 9/2016 | Proksch et al. |
| 10,006,935 B2 | 6/2018 | Unwin et al. |
| 10,008,427 B2 * | 6/2018 | Davis .................. H01L 21/563 |
| 2008/0307864 A1 * | 12/2008 | Uchihashi .............. G01Q 60/32 73/105 |
| 2009/0070904 A1 | 3/2009 | West et al. |
| 2011/0138507 A1 | 6/2011 | La Rosa Flores et al. |
| 2012/0102601 A1 | 4/2012 | Jeong et al. |
| 2013/0032495 A1 | 2/2013 | Unwin et al. |
| 2018/0100947 A1 * | 4/2018 | Hajiani .............. G01N 29/2468 |
| 2019/0056428 A1 * | 2/2019 | Schwarz ................ G01Q 60/32 |

OTHER PUBLICATIONS

James, P.J. et al., "Interpretation of contrast in tapping mode AFM and shear force microscopy. A study of Nation", ACS Publications, Dec. 21, 2000.

Miller, A. J., "Applications of acoustic microscopy in the semiconductor industry", Acoustical Imaging, 1982, p. 67-78, vol. 12.

Rabe, U. et al., "Acoustic microscopy by atomic force microscopy", Applied Physics Letters 64(12), 1994, p. 1493-1495.

Yamanaka, K. et al., "Ultrasonic force microscopy for nanometer resolution subsurface imaging", Applied Physics Letters 64(2), 1994, p. 178-180.

Verbiest, G. J. et al., "Subsurface-AFM: sensitivity to the heterodyne signal", Nanotechnology 24(36), 2013, p. 1-6.

Shekhawat, G. S. et al., "Nanoscale imaging of buried structures via scanning near-field ultrasound holography", Science 310(5745), 2005, p. 89-92.

Venkatesh, V. et al., "A structural model of ultra-microelectrodes for shear-force based scanning electrochemical microscopy", Journal of Intelligent Material Systems and Structures 29(18), 2018, p. 3562-3571.

\* cited by examiner

METHODS AND SYSTEMS TO DETECT SUB-SURFACE DEFECTS IN ELECTRONICS MODULES USING SHEAR FORCE MICROSCOPY

TECHNICAL FIELD

The present specification generally relates to a method for detecting sub-surface defects in electronics modules and, more specifically, to methods and systems to detect sub-surface defects in electronic modules using shear force microscopy.

BACKGROUND

Operation of semiconductors in power electronics assemblies in electrified vehicles and other high heat environments can generate large heat flux. Due to the dissimilar coefficient of thermal expansion between various layers of a power electronics assembly, one or more layers of the assembly may flex due to the thermomechanical stresses. This movement may cause the semiconductor chip to crack and become damaged.

Defects such as cracks or voids within a power electronics device or a bond layer between a power electronics device and a substrate may cause the power electronics assembly to fail. Thus, it may be desirable to detect such defects in power electronics devices before they are put into a system.

Recent advances in manufacturing have propelled the development of non-destructive characterization techniques to understand material properties at the nanoscale. Among these non-destructive characterization techniques, confocal scanning acoustic microscopy (C-SAM) has been popularly used to detect voids, cracks and defects in the semiconductor industry. However, the resolution of C-SAM is limited by the diameter of a collimated acoustic beam (typically on the order of a few microns) that propagates through the sample. In an effort to increase spatial resolution, SAM has been previously integrated with scanning probe microscopy, which consists of a scanning probe mounted on a vibrating cantilever, in a variety of techniques including: atomic force acoustic microscopy (AFAM), ultrasonic force microscopy (UFM), heterodyne force microscopy (HFM), and scanning near-field ultrasound holograpy.

While these techniques have been used to study structural and elastic properties of materials, the depth of penetration of acoustic waves (near-field distance) is generally limited to between 10 nm-1 µm. As a result, such techniques are limited to characterization of sub-surface defects that lie in the near-field distance and fail to capture structures and defects that are embedded well within the sample. Accordingly, a need exists for an improved method of detecting sub-surface defects in power electronic modules.

SUMMARY

In one embodiment, a method of detecting sub-surface voids in a sample may include positioning a probe adjacent to a first point on the sample, emitting an ultrasonic wave from the probe towards the sample, moving the probe towards the sample, measuring a shear force amplitude of a reflection of the ultrasonic wave at the probe as the probe moves towards the sample, creating an approach curve by plotting the measured shear force amplitude of the reflection of the ultrasonic wave as a function of a distance between the probe and the sample, and determining whether a sub-surface void exists at the first point on the sample based on a slope of the approach curve.

In another embodiment, a method may include positioning a probe adjacent to a plurality of points of a sample at a first distance from the sample, emitting a first plurality of ultrasonic waves at a plurality of frequencies from the probe towards the sample at each of the plurality of points adjacent to the sample at the first distance, measuring bulk shear force amplitudes of reflection of each of the first plurality of ultrasonic waves at the probe for each of the plurality of points adjacent to the sample at the first distance, repositioning the probe adjacent to the plurality of points of the sample at a second distance from the sample, wherein the second distance is less than the first distance, emitting a second plurality of ultrasonic waves at the plurality of frequencies from the probe towards the sample at each of the plurality of points adjacent to the sample at the second distance, measuring surface shear force amplitudes of reflection of each of the second plurality of ultrasonic waves at the probe for each of the plurality of points adjacent to the sample at the second distance, computing an error value for each of the plurality of frequencies at each of the plurality of points by subtracting the surface shear force amplitude from the bulk shear force amplitude measured for each of the plurality of frequencies at each of the plurality of points, determining a set of frequencies from the plurality of frequencies comprising a frequency that has a maximum error value for each of the plurality of points, selecting a predetermined number of points from among the plurality of points to determine a set of selected points, for each point among the set of selected points, creating an approach curve at that point using an associated frequency from the set of frequencies that has the maximum error value for that point, for each point among the set of selected points, determining a slope of the approach curve at that point, and determining using a machine learning algorithm, an optimum frequency based on the slope of the approach curve at each point of the set of selected points.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Disclosed herein are methods for detecting sub-surface voids in substrate assemblies, such as power electronics modules. Methods disclosed herein involve the use of a scanning probe having a dither and a receiver to detect sub-surface voids. The dither may output an ultrasonic wave that is transmitted along the width of a sample and the receiver may detect a reflection of the wave from the edge of the sample. When the probe is a bulk distance away from the sample, the amplitude of the reflected wave detected by the receiver is relatively constant as a function of the distance from the sample. However, when the probe is sufficiently close to the sample, the amplitude of the reflected wave detected by the receiver begins to change due to a change in hydrodynamic boundary conditions.

By moving the probe closer to the sample and measuring the amplitude of the reflected wave as the probe is so moved, an approach curve can be plotted showing the amplitude of the reflected wave as a function of the distance between the probe and the sample. The slope of this approach curve will change as a function of the sub-surface properties of the sample. Thus, the slope of the approach curve may be used as a metric to locate the presence of defects within the sample.

To create approach curves that may be used to detect sub-surface voids within a sample, the probe should be operated at a frequency that is sensitive to such voids. Also disclosed herein are methods using machine learning techniques to determine an optimum frequency at which to operate the probe.

Figure 1:
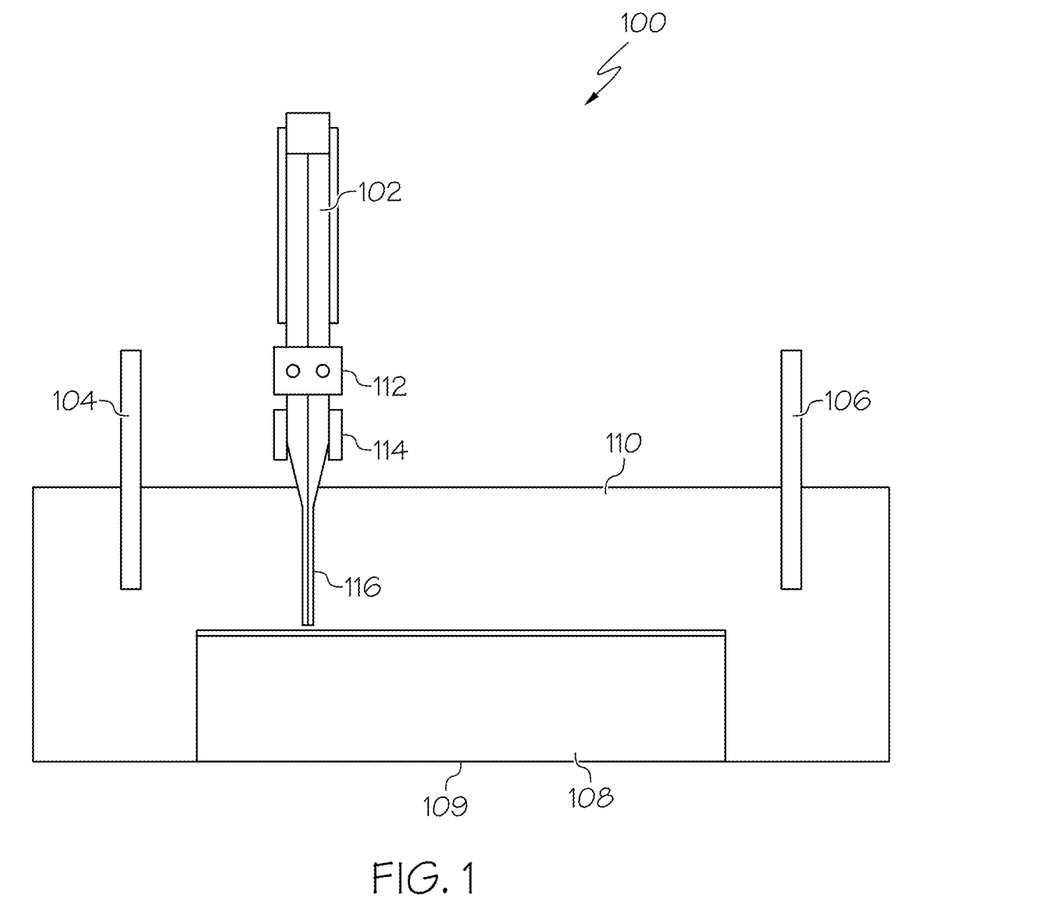
FIG. 1 schematically depicts an example three electrode system for detecting voids in power electronics modules, according to one or more embodiments shown or described herein.

Referring now to FIG. 1, one example embodiment of a three electrode system 100 is shown that may be used in a system for detecting sub-surface voids in a sample. The three electrode system 100 comprises a scanning probe 102, a counter electrode 104, a reference electrode 106, and a sample 108. The sample 108 may be a semiconductor or other power electronics device in which sub-surface voids are to be detected. The sample 108 may include a gold deposition layer. In the illustrated example, the sample 108 includes a gold deposition layer having a thickness of 100 nm.

The sample 108 may be submerged in a solution 110. The solution 110 may comprise electrolyte containing redox mediator. In the illustrated example, the solution 110 comprises 1 mM FcMeOH and 100 mM KCl. In other examples, the solution 110 may comprise other compositions. The counter electrode 104 and the reference electrode 106 may be partially submerged in the solution 110.

In the three electrode system 100, a known voltage or a known current may be established between the probe 102 and the counter electrode 104. The reference electrode 106 may comprise a half cell with a known reduction potential and may act as a reference in measuring and controlling the potential of the probe 102.

The probe 102 may comprise a dither 112, a receiver 114, and a tip 116. The dither 112 may output ultrasonic waves and the receiver 114 may receive waves (e.g., reflected ultrasonic waves emitted by the dither 112) through the tip 116. In the illustrated example, the probe 102 is a glass electrode. In other examples, the probe 102 may comprise any other suitable material having the dither 112, the receiver 114, and the tip 116. In the illustrated example, the diameter of the tip is about 1 μm, although embodiments are not limited thereto. In the illustrated example, the counter electrode 104 is gold or platinum and the reference electrode 106 is silver or silver chloride. In other examples, the counter electrode 104 and the reference electrode 106 may comprise any other suitable materials.

When the dither 112 of the probe 102 outputs an ultrasonic wave, the wave may travel through the width of the sample 108 and may reflect off an edge 109 of the sample 108. After reflection, the wave may travel back through the width of the sample 108 and pass through the tip 116 of the probe 102. The receiver 114 may then receive the reflected wave. The amplitude of the reflected wave received by the receiver 114 is referred to herein as the shear force amplitude.

Figure 2A:
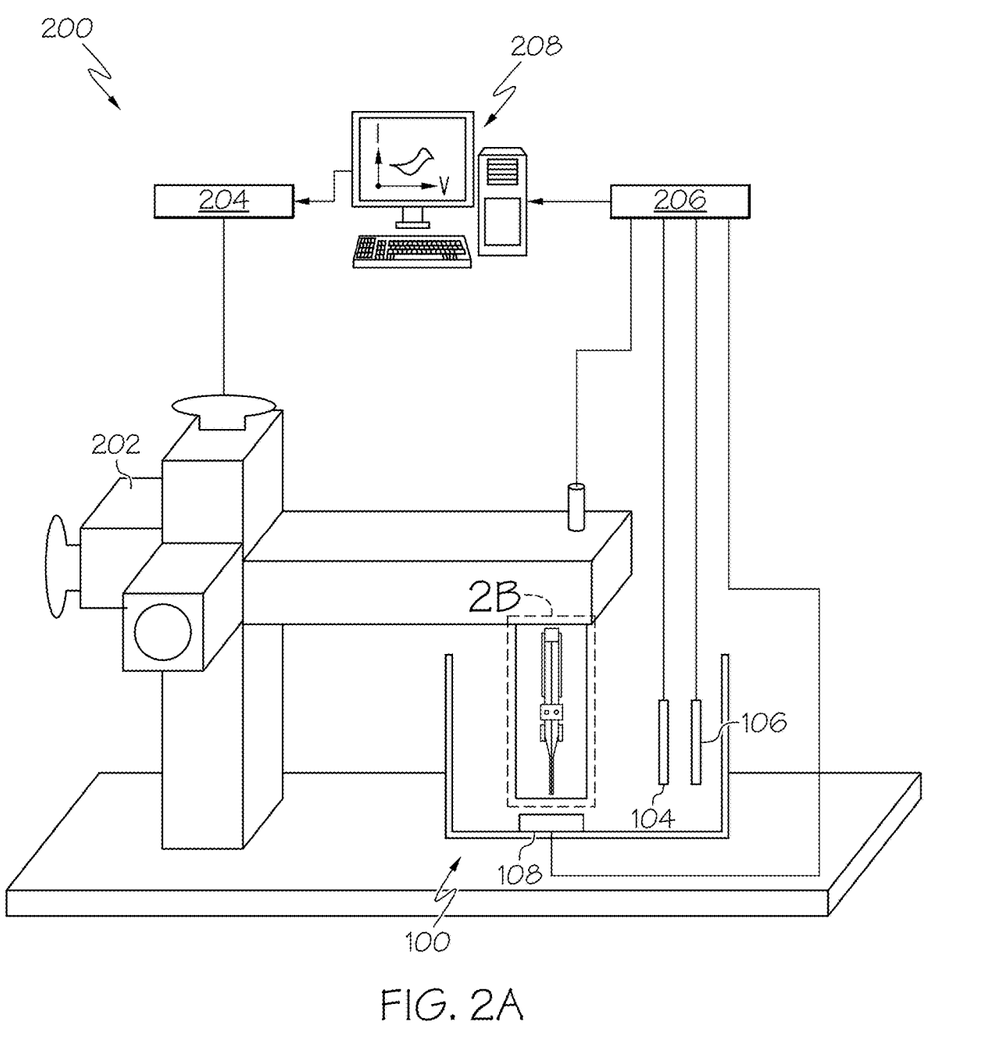
FIG. 2A schematically depicts an example system for detecting sub-surface voids in power electronics modules, according to one or more embodiments shown or described herein.
Figure 2B:
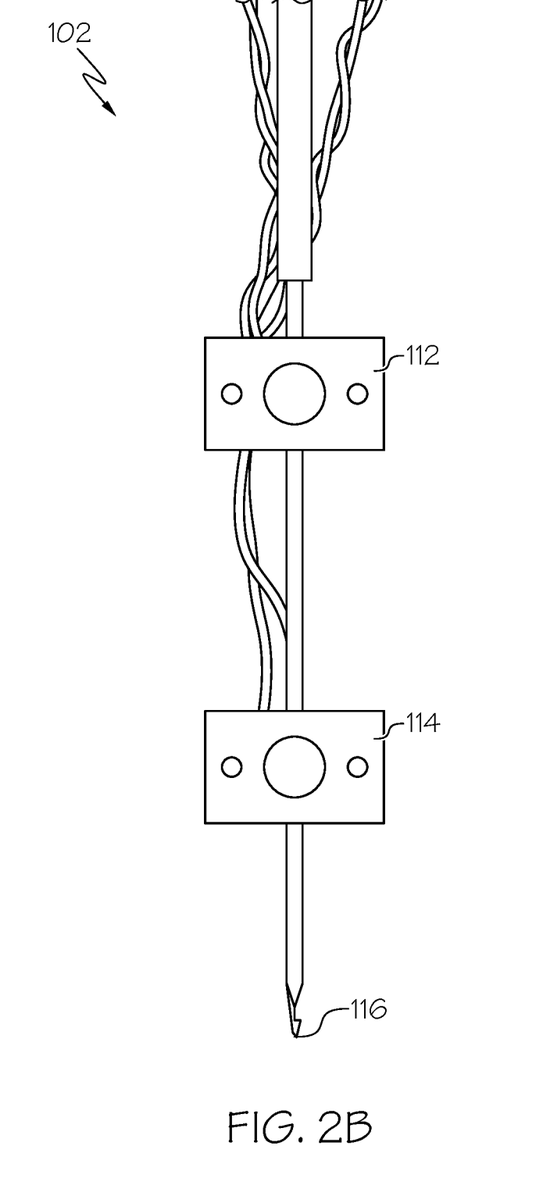
FIG. 2B depicts a close-up view of a probe of the example system of FIG. 2A.

Referring now to FIG. 2A, an example system 200 is illustrated for detecting sub service voids in a sample. The system 200 includes the three electrode system 100 of FIG. 1. FIG. 2B shows another view of the probe 102 of FIG. 1. Referring back to FIG. 2A, the probe 102 is connected to an actuator 202. The actuator 202 is able to move the probe 102 very small distances in any direction. The actuator 202 is able to move the probe 102 axially (e.g., parallel to the sample 108) to be positioned at different points above the sample 108. The actuator 202 is also able to move the probe 102 up or down (e.g., perpendicular to the sample 108) closer to or away from the sample 108. An actuator controller 204 is connected to the actuator 202 and may control the actuator 202.

A bipotentiostat 206 is connected to the probe 102, the counter electrode 104, the reference electrode 106, and the sample 108. The bipotentiostat 206 may control the voltages and/or currents of the three electrode system 100. The bipotentiostat 206 may cause the dither 112 of the probe 102 to emit ultrasonic waves. The bipotentiostat 206 may also measure the shear force amplitude of reflected waves received by the receiver 114 of the probe 102.

A control system 208 (e.g., a computer system) may receive the shear force amplitudes measured by the bipotentiostat 206. The control system 208 may also control the actuator controller 204, which in turn controls the actuator 202. The shear force amplitudes received by the control system 208 may be stored and used for later data analysis.

Figure 3:
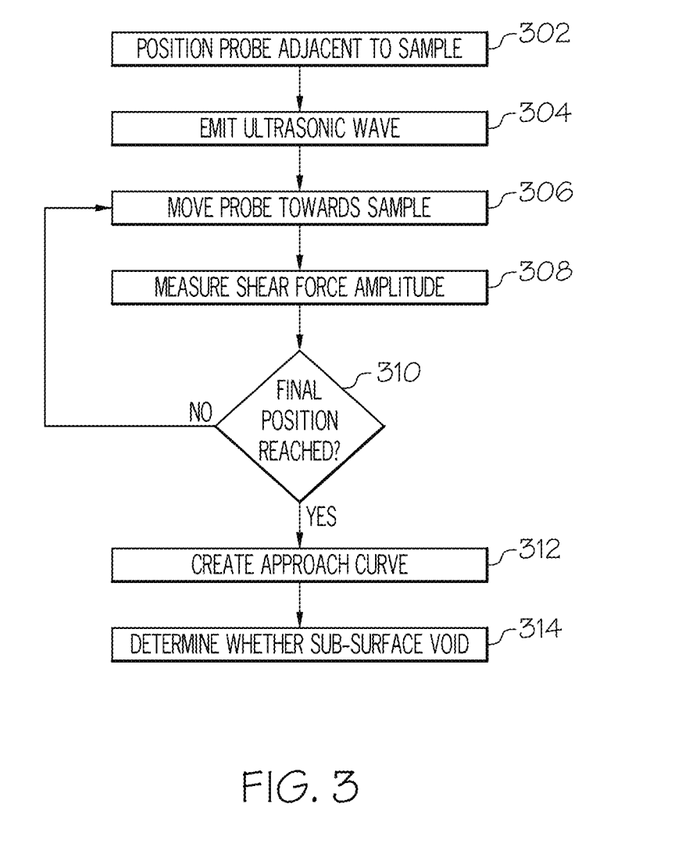
FIG. 3 depicts a flowchart of an example method for detecting sub-surface voids in power electronics modules, according to one or more embodiments shown and described herein.

FIG. 3 depicts a flowchart for detecting sub-surface voids in power electronics modules, according to one or more embodiments shown and described herein. At step 302, the actuator 202 positions the probe 102 adjacent to the sample 108 (e.g., above the sample 108 in the orientation of FIG. 2). The actuator 202 may position the probe 102 adjacent to a particular point on the sample 108 where a sub-surface void is to be detected if such a void exists. The actuator 202 initially positions the probe 102 such that the tip 116 of the probe 102 is far enough from the sample 108 such that the influence of hydrodynamic shear between the probe 102 and the surface of the sample 108 will not affect the shear force amplitude of reflected waves. This distance is referred to herein as a bulk distance. In the illustrated example, the bulk distance is about 100 µm above the sample. However, in other examples, this distance may be more or less depending on the properties of the probe 102 and the sample 108.

At step 304, the dither 112 of the probe 102 emits an ultrasonic wave. The ultrasonic wave is emitted by the dither 112 towards the sample 108 such that the ultrasonic wave travels towards the sample 108, travels through the width of the sample 108, is reflected off the edge 109 of the sample 108, travels back through the width of the sample 108 to the tip 116 of the probe 102 and is received by the receiver 114. The frequency of the ultrasonic wave emitted by the dither 112 may be selected such that sub-surface voids in the sample 108 are sensitive to the selected frequency. Methods for selecting this frequency are discussed in further detail below in connection with FIGS. 5-6.

At step 306, the actuator 202 begins to move the probe 102 towards the sample 108 while the dither 112 continues to emit the ultrasonic wave. While the probe 102 is moved towards the sample 108, the actuator 202 maintains the lateral position of the probe 102 with respect to the sample 108. That is, the tip 116 of the probe 102 remains above the same point on the sample 108 while it moves towards the sample 108. In the illustrated example, the actuator 202 moves the probe 102 towards the sample 108 at a constant velocity. As the probe 102 moves closer to the sample 108, the ultrasonic wave continues to be emitted by the dither 112 at shorter distances from the sample 108.

At step 308, the bipotentiostat 206 measures the shear force amplitude of waves received by the receiver 114 of the probe 102. The control system 208 may store the measured amplitude. The bipotentiostat 206 continually measures the shear force amplitude of the ultrasonic waves received by the receiver 114 as the probe 102 moves closer to the sample 108. As explained above, at a bulk distance from the sample 108, the hydrodynamic shear between the probe 102 and the surface of the sample 108 will not affect the shear force amplitude. Thus, as the probe 102 initially begins to move towards the sample 108, the shear force amplitude will remain relatively constant. However, when the tip 116 of the probe 102 is in the vicinity of the sample 108 (e.g., 1-2 µm above the sample), the change in hydrodynamic boundary conditions will cause the shear force amplitude measured by the bipotentiostat 206 to differ from the shear force amplitude measured at a bulk distance from the sample 108. This distance is referred to herein as a near-surface distance. The control system 208 may continually record the shear force amplitudes measured by the bipotentiostat 206 as the probe 102 approaches the sample 108.

At step 310, the control system 208 determines whether the probe 102 has reached a position sufficiently close to the surface of the sample 108. This position should be a small enough distance from the sample 108 such that the measured shear force amplitude has varied enough to create an approach curve, which is discussed in further detail below. However, this position should not be so close to the sample 108 that the probe 102 is damaged. This distance may depend on the characteristics of the sample 108 (e.g., surface roughness). If this position has not yet been reached, control returns to step 306 and the actuator 202 continues to move the probe 102 closer to the sample 108. That is, until this final position has been reached, the actuator 202 continually moves the probe 102 towards the sample 108 while the dither 112 continually emits ultrasonic waves and the bipotentiostat 206 measures the shear force amplitude of the reflected ultrasonic waves received by the receiver 114. Once this position has been reached, control moves to step 312.

Figure 4A:
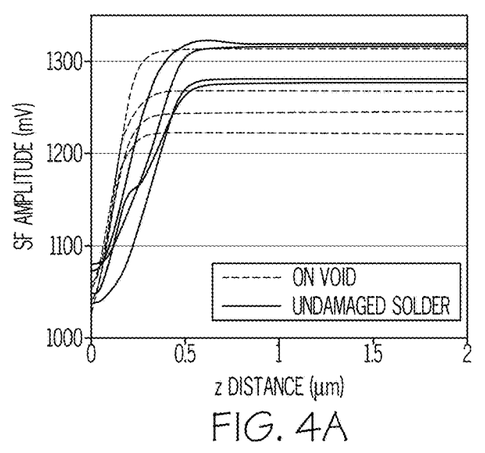
FIG. 4A depicts sample approach curves obtained using the systems and methods disclosed herein.

At step 312, the control system 208 creates an approach curve for the point on the sample 108 above which the probe 102 was positioned. An approach curve comprises a plot of shear force amplitude vs. distance between the probe 102 and the sample 108. FIG. 4A shows sample approaches curves for an exemplary sample. The approach curves of FIG. 4A plot shear force amplitude in mV vs. distance in µm between the probe 102 and the sample 108 over a range of 0-2 µm above the surface of the sample 108. In FIG. 4A, the solid lines represent approach curves at points on the exemplary sample where there are no sub-surface voids and the dashed lines represent approach curves at points on the exemplary sample where there are sub-surface voids.

As can be seen in FIG. 4A, at a distance of greater than about 0.5 µm, the shear force amplitude is relatively constant whether or not there is a sub-surface void. However, at distances less than about 0.5 µm, the shear force amplitude decreases. While the shear force amplitude decreases near the surface for both points where there is damage and points where the is not damage, it can be seen from FIG. 4A that the slope of the approach curve is lower (i.e., the approach curve is not as steep) at points where there are sub-surface voids compared to points where there are not sub-surface voids. Thus, the slope of the approach curve may be used as a metric to determine whether a sub-surface void exists at a particular point on a sample.

Figure 4B:
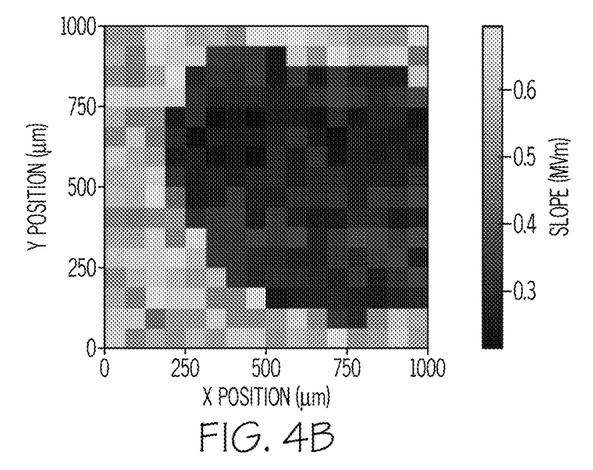
FIG. 4B depicts an example sub-surface void map for a sample created using the systems and methods disclosed herein
Figure 4C:
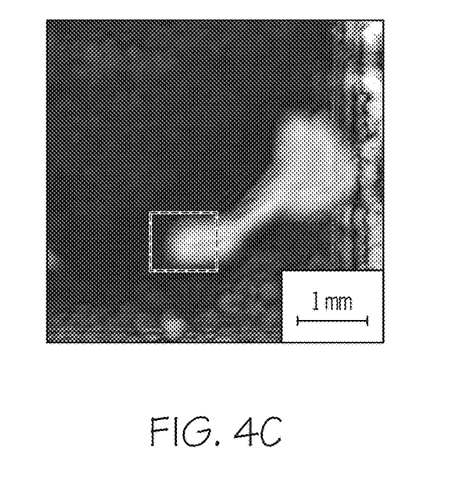
FIG. 4C depicts an example sub-surface void map for the sample of FIG. 4B created using scanning acoustic microscopy.

Referring back to FIG. 3, at step 314, the control system 208 determines the slope of the approach curve and determines whether a sub-surface void exists at the point on the sample 108 being measured based on the slope of the approach curve. The method of FIG. 3 may be repeated for any number of points on the sample 108 to determine whether a sub-surface void exists at each point. A map of the sample 108 may then be created showing the locations of sub-surface voids on the sample 108. FIG. 4B shows an exemplary map of sub-surface voids for a portion of an exemplary sample. For comparison, FIG. 4C shows an image of a sub-surface void map create using a traditional SAM technique. The portion of FIG. 4C enclosed by the rectangle is the portion of the exemplary sample mapped in FIG. 4B. It may be seen that the results are similar.

In order for the above described method to accurately detect sub-surface voids, the dither 112 of the probe 102 should output ultrasonic waves at a frequency that is sensitive to sub-surface voids. A variety of methods may be used to determine this optimum frequency, as described below. One method, described below in connection with FIG. 5, involves manually determining an optimum frequency. Another method, described below in connection with FIG. 6, involves using machine learning to determine an optimum frequency.

Figure 5:
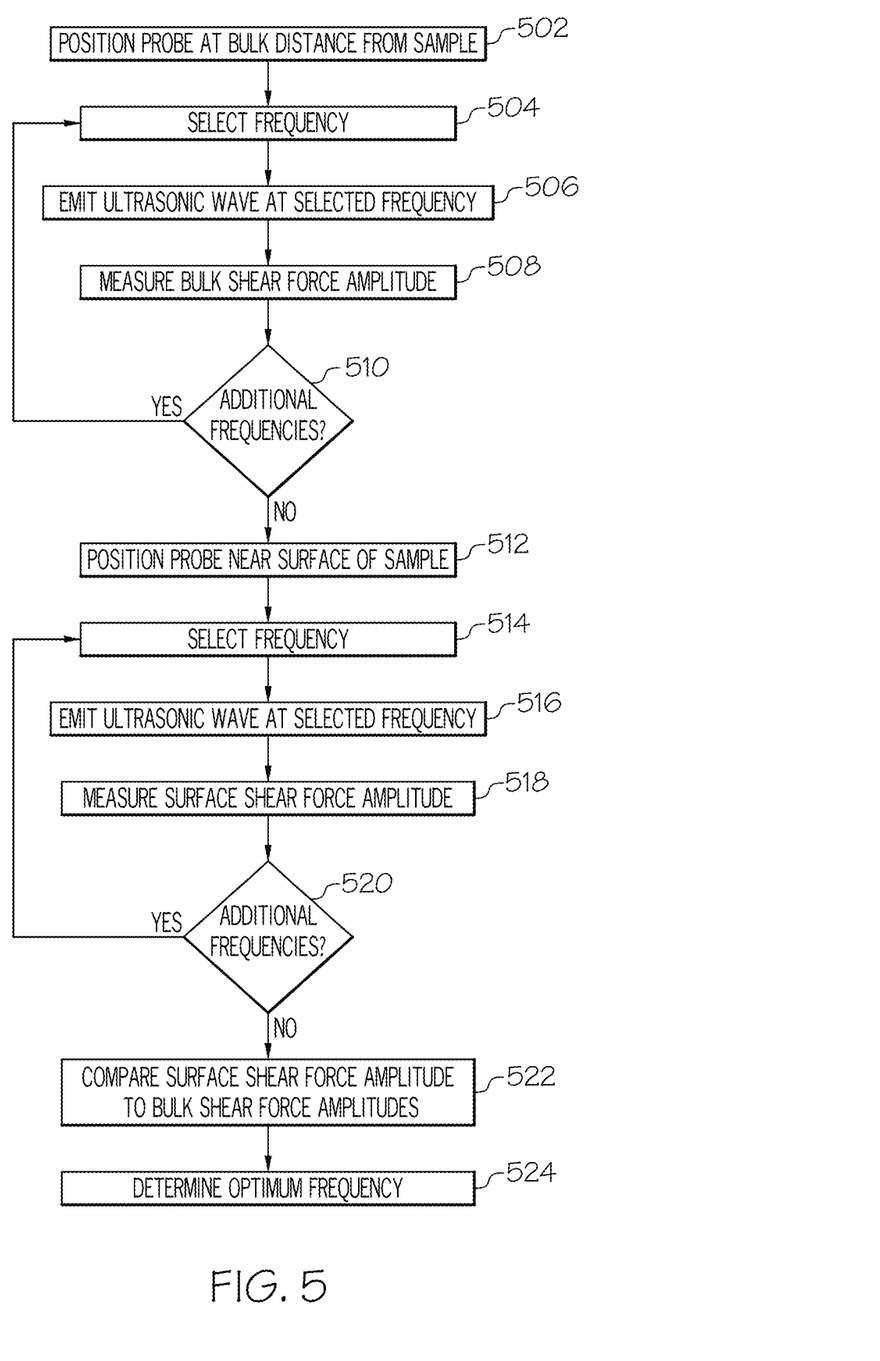
FIG. 5 depicts a flowchart of an example method for determining an optimum frequency to be used to detect sub-surface voids, according to one or more embodiments shown and described herein.

FIG. 5 depicts a flowchart of an example method for selecting an optimum frequency for detecting sub-surface voids in power electronics modules, according to one or more embodiments shown and described herein. At step 502, the actuator 202 positions the probe 102 above a point on the sample 108 at a bulk distance. Then, at step 504, an initial frequency is selected to be tested for its sensitivity to sub-surface voids, as described herein. In the remaining steps of FIG. 5, a variety of other frequencies may be tested as well, as disclosed herein, and the best performing frequency may be determined to be the optimum frequency. In the illustrated example, at step 504, the frequency is selected in a range between 100 kHz-900 kHz.

At step 506, the dither 112 of the probe 102 emits an ultrasonic wave at the selected frequency towards the sample 108. The ultrasonic wave may travel through the width of the sample 108 and reflect off the edge 109 of the sample 108. The reflected ultrasonic wave may then be transmitted through the tip 116 of the probe 102 and may be received by the receiver 114. Then at step 508, the bipotentiostat 206 measures the shear force amplitude of the reflected ultrasonic wave at the bulk distance from the sample 108. The control system 208 may store this measured value.

At step 510, the control system 208 or an operator of the system 200 determines whether additional frequencies are to be tested. In some examples, a set number of frequencies (e.g., 20 different frequencies) may be selected and tested for their sensitivity to sub-surface voids. In other examples, other metrics (e.g., the measured shear force amplitude at the bulk distance) may be used to determine whether additional frequencies are to be selected and tested. If, at step 510, additional frequencies are to be tested, then control returns to step 504 and an additional frequency is selected. The steps 504-508 may then be repeated for any number of selected frequencies. If, at step 510, additional frequencies are not to be tested, control passes to step 512.

At step 512, the actuator 202 moves the probe 102 to a near-surface distance from the sample 108 while maintaining the lateral position of the probe 102 with respect to the sample 108. That is, the actuator 202 keeps the tip 116 of the probe 102 above the same position on the sample 108 but moves the tip 116 of the probe 102 from a bulk distance above the sample 108 to a position near the surface of the sample 108 where hydrodynamic boundary conditions will cause the shear force amplitude to be noticeably different from the shear force amplitude at a bulk distance (i.e., a near-surface distance).

At step 514, one of the frequencies selected at step 504 is selected. That is, for each of the frequencies that were selected when the probe 102 was at a bulk distance from the surface of the sample 108, the same frequencies will be selected when the probe 102 is at the near-surface distance from the sample 108. Thus, shear force amplitude may be measured for each of the selected frequencies at a bulk distance from the sample 108 and also at a near-surface distance from the sample 108.

At step 516, the dither 112 of the probe 102 emits an ultrasonic wave at the frequency selected at step 514. This ultrasonic wave will travel through the width of the sample 108, reflect off of the edge 109 of the sample 108, travel back to the tip 117 of the probe 102 and be received by the receiver 114. Then, at step 518, the bipotentiostat 206 measures the shear force amplitude of the reflected wave while the tip 116 of the probe 102 is at a near-surface distance. The control system 208 may store this measured value.

At step 520, the control system 208 or an operator of the system 200 determines whether additional frequencies need to be selected. That is, it is determined whether all the frequencies selected at step 504 have also been selected at step 514. If, at step 520, additional frequencies need to be selected, control returns to step 514 and another frequency is selected. The steps 514-518 may then be repeated for each of the frequencies that were selected at step 504. If, at step 520, all of the frequencies selected at step 504 have been selected at step 514, control passes to step 522.

At step 522, the control system 208 compares the shear force amplitude measured at each of the selected frequencies at a bulk distance from the sample 108 and the amplitude measured at each of the selected frequencies at a near-field distance from the sample 108. Specifically, for each of the frequencies selected at steps 504 and 514, the control system 208 or an operator of the system 200 subtracts the near-field shear force amplitude from the bulk distance shear force amplitude. Then, at step 524, the control system 208 or an operator of the system 200 may determine which of the selected frequencies had the greatest corresponding difference between the bulk distance shear force amplitude and the near-field shear force amplitude. The control system 208 or an operator of the system 200 may select this frequency as the optimum frequency; that is the frequency that is most sensitive to sub-surface voids. The selected optimum frequency may then be used to detect sub-surface voids in the sample 108 according to the method of FIG. 3.

While the method of FIG. 5 discussed above may be useful in determining a frequency that is sensitive to sub-surface voids, the method may have certain limitations. In particular, the method relies upon selecting some number of frequencies and testing each of the selected frequencies. Since the number of frequencies selected and tested is limited, the actual optimum frequency may never be selected and tested. Accordingly, the optimum frequency may not be found. Therefore, another method of determining an optimum frequency using machine-learning techniques is described below with reference to FIG. 6.

Figure 6:
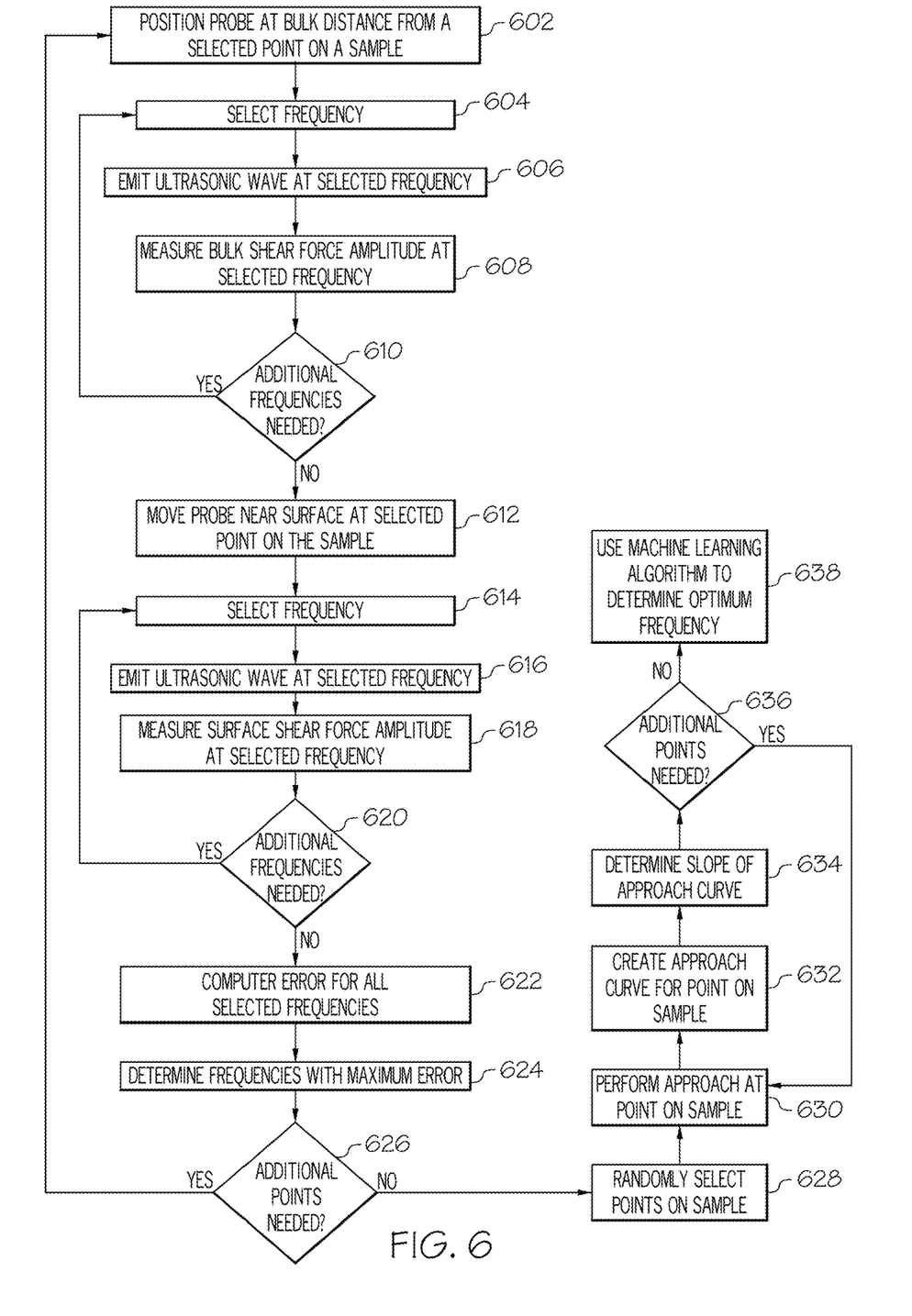
FIG. 6 depicts a flowchart of an example method for using machine learning methods to determine an optimum frequency to be used to detect sub-surface voids, according to one or more embodiments shown and described herein.

FIG. 6 depicts a flowchart for selecting an optimum frequency for detecting sub-surface voids in power electronics modules, according to one or more embodiments shown and described herein. At step 602, the actuator 202 positions the probe 102 above a point on the sample 108 with the tip 116 of the probe 102 at a bulk distance from the surface of the sample 108. In some examples, the control system 208 randomly selects the point above the sample 108 to position the probe 102. In some examples, the control system 208 establishes scan limits prior to the actuator 202 positioning the probe 102 above the sample 108.

The scan limits may limit the area of the sample 108 from which points may be selected at step 302 or may limit how close the tip 116 of the probe 102 may get to the surface of the sample (i.e., may limit the near-surface distance). For example, a sample that is 5×5 mm may have an active region that is only 3×3 mm. Accordingly, it may be desirable to only look for damage in the active region. Accordingly, the scan limits may be limited to the active region such that the control system 208 does not select any points on the sample 108 outside of the active region. In addition, if the tip 116 of the probe 102 gets too close to the surface of the sample 108, the probe 102 may become damaged. Accordingly, the scan limits may establish a limit as to how close the near-surface distance may be. In some examples, the near-surface distance limit may be based on properties of the sample 108 (e.g., surface roughness).

At step 604, the control system 208 selects an initial frequency to test for sensitivity to sub-surface voids. In the example of FIG. 6, the dither 112 of the probe 102 outputs a plurality of frequencies over a range of frequencies to be considered as possibly being the optimum frequency. Thus, at step 604, the initial frequency may be selected as the lowest frequency of the range of frequencies to be considered. In other examples, the initial frequency may be selected as the highest frequency of the range of frequencies to be considered. In the illustrated example, the range of frequencies to be considered is 100-900 kHz. In another example, the range of frequencies to be considered may be 100-600 kHz. In another example, the range of frequencies to be considered may be 400-600 kHz. In other examples, other ranges of frequencies may be considered.

At step 606, the dither 112 of the probe 102 emits an ultrasonic wave at the frequency selected at step 604. This wave may travel through the width of the sample 108, reflect off of the edge 109 of the sample, travel back through the width of the sample 108, and be received by the receiver 114. At step 608, the bipotentiostat 206 measures the shear force amplitude of the reflected wave received by the receiver 114. The control system 208 may store this measured value.

At step 610, the control system 208 determines whether additional frequencies of ultrasonic waves need to be output by the dither 112. As explained above, the dither 112 outputs frequencies over a certain selected range of frequencies. Thus, at step 610, the control system 208 may determine whether the upper limit of the frequency range has been reached. If the upper limit of the frequency range has not been reached, control returns to step 604 and additional frequencies are selected. Thus, the steps 604-608 are repeated at a plurality of frequencies within the selected range of frequencies being output by the dither 112. In the illustrated example, the frequency of ultrasonic waves output by the dither 112 is continually increased such that the dither 112 outputs ultrasonic waves at a large number of frequency values within the selected range of frequencies. In some examples, the initial frequency is the maximum frequency among the selected range of frequencies and the frequency of ultrasonic waves output by the dither 112 is continually decreased. When, at step 610, the control system 208 determines that all desired frequencies have been output by the dither 112, control passes to step 612.

At step 612, the actuator 202 moves the probe 102 to a near-surface distance above the same point on the sample 108. In some examples, the near-surface distance may be found using current data as disclosed herein. In other examples, the near-surface distance may be a fixed distance from the surface of the sample 108 (e.g., 30-40 nm). In other examples, the near-surface distance may be set as a distance from the surface of the sample 108 where the shear force amplitude has changed by a predetermined amount (e.g., 150 mV).

In some examples, the tip 116 of the probe 102 may comprise a cylindrical capillary. There may be may be a platinum wire inside the tip 116 that forms a core of the capillary. In the illustrated example, the platinum core may have a diameter of between 100-400 nm. The platinum core may be used to measure ionic current (e.g., redox mediator current) between the surface of the sample 108 and the probe 102, which may be used to find the near-surface distance as described below.

When the probe 102 is a bulk distance from the sample 108, the ionic current is relatively constant as a function of the distance from the sample 108. This is similar to shear force amplitude, which is relatively constant as a function of the distance between the probe 102 and the sample 108, as discussed above. However, ionic current data is not as sensitive as shear force amplitude. That is, while shear force amplitude will generally not start to vary until the tip 116 of the probe 102 is less than 1 μm from the surface of the sample 108, the ionic current will start to vary when the tip 116 of the probe 102 is about 5-10 μm above the sample 108. The ionic current will then continue to vary as the tip 116 of the probe 102 is brought closer to the surface of the sample 108. Accordingly, as the actuator 202 is moving the probe 102 closer to the sample 108, measurements of ionic current may be used to determine when the probe 102 has reached the near-surface distance.

At step 614, once the probe 102 has reached a near-surface distance above the sample 108, the control system 208 selects an initial frequency. The initial frequency selected at step 614 is the same as the initial frequency selected at step 604. Next, at step 616, the dither 212 emits an ultrasonic wave at the frequency selected at step 614. Then, at step 618, the bipotentiostat 206 measures the amplitude of the reflected ultrasonic wave received by the receiver 214. The control system 208 may store this measured value.

At step 620, the control system 208 determines whether additional frequencies of ultrasonic waves need to be output by the dither 112. When the probe 102 is at the near-field distance from the sample 108, the dither 112 may emit ultrasonic waves at the same frequencies as when the probe 102 was at the bulk distance from the sample 108. Thus, if the control system 208 determines that additional frequencies are needed, control may return to block 614 and steps 614-618 may be repeated with the dither 112 outputting ultrasonic waves at different frequencies within the selected range of frequencies. As such, the bipotentiostat 206 may measure shear force amplitude for a plurality of frequencies within the selected frequency range at bulk distance and also at near-surface distance. Once the control system 208 determines that no additional frequencies are to be selected, control passes to step 622.

At step 622, the control system 208 computes an error value for each of the frequencies selected at steps 604 and 614, where the error value is defined as the difference between the shear force amplitude at a bulk distance and the shear force amplitude at a near-surface distance. That is, for each frequency of ultrasonic wave emitted by the dither 112, the bipotentiostat 206 measures a shear force amplitude at a bulk distance from a point on the sample 108 and at a near-field distance from the same point on the sample 108, as explained above. At step 622 the control system 208 computes an error value for each frequency by subtracting the measured shear force amplitude at the near-field distance for that frequency from the measured shear force amplitude at the bulk distance for that frequency. Thus, the control system 208 determines an error value for each frequency at which the dither 212 emitted an ultrasonic wave at that chosen point above the sample 108. Then, at step 624, the control system 208 determines the maximum error value among each of these error values and determines the corresponding frequency or frequencies for which this error value occurred.

At step 626, the control system 208 determines whether additional points on the surface of the sample 108 are to be tested. As explained above, at step 624, the control system 208 determines the frequencies that have the maximum error value at one point on the sample 108. However, it is generally not known beforehand which points on the sample 108 have a sub-surface void and which points do not. Thus, in the method of FIG. 6, frequencies with maximum error values are computed at a variety of points on the surface of the sample 108. In the illustrated example, a fixed number of points on the surface of the sample 108 are so selected (e.g., 10 points). In some examples, the number of points selected depends on the size of the sample 108 or the size of the area within the scan limits of the sample 108 (e.g., the size of the active region of the sample 108). In the illustrated example, the locations of the points on the sample 108 where an error value is to be determined are selected randomly. In other examples, the locations of the points on the sample 108 may be selected by a deterministic method.

If, at step 626, the control system 208 determines that additional points are to be tested, then control returns to step 602 and the actuator 202 moves the probe 102 over another point on the surface of the sample 108. The steps 602-624 are then repeated and the control system 208 determines the frequencies corresponding to the maximum error value at the newly selected point on the surface 608. Once the frequencies corresponding to the maximum error value have been computed for all of the selected points on the sample 108, the control system 208 determines, in step 626, that no additional points need to be selected and control passes to step 628. The control system 208 may arrange the frequencies corresponding to the maximum error value in descending order.

Once some number of frequencies with the maximum error value have been found, approach curves may be created at some number of points on the sample 108 using those frequencies. The slopes of those approach curves may then be measured to find an optimum frequency, as disclosed below.

At step 628, some number of points on the sample 108 from among the points selected at step 602 are selected. In the example of FIG. 6, a fixed number of points (e.g., five points) are selected at step 628. In other examples, the number of points selected may be determined based one or more metrics. In the example of FIG. 6, the locations of the points selected at step 628 are chosen randomly. In other examples, a deterministic method may be used to select the points on the sample 108.

At step 630, one of the selected points on the sample 108 is chosen and an approach is performed with the probe 102 at that point above the sample 108 using the frequency corresponding to the maximum error value found for the chosen point. An approach may comprise steps 302-310 of FIG. 3. That is, the tip 116 of the probe 102 may be positioned above the selected point on the sample 108 at a bulk distance and the probe 102 may be moved to a near-surface distance above the selected point while the dither 112 emits an ultrasonic wave at the frequency corresponding to the maximum error value found for the selected point. The bipotentiostat 206 may measure the shear force amplitude of reflected ultrasonic waves received by the receiver 114 while the probe 102 is moved from the bulk distance to the near-surface distance.

At step 632, after the approach is performed at the selected point, the control system 208 creates an approach curve for the chosen point by plotting the measured shear force amplitude as a function of distance from the tip 116 of the probe 102 to the surface of the sample 108. Then, at step 634, the control system 208 determines the slope of the approach curve.

At step 636, the control system 208 determines whether approach curves have been created for all of the points selected at step 628. If approach curves have not been created for all of the selected points, then control returns to step 630 and an approach curve is created for another one of the points selected at step 628 using the frequency that gave rise to the maximum error value for that point. If approach curves have been created for all of the selected points, then control passes to step 638.

At step 638, a machine learning algorithm may be used to determine the optimum frequency based on the slopes of the approach curves determined at step 634. That is, a machine learning algorithm may be used to predict what frequency will cause an approach curve to have a the greatest slope (i.e., a slope most sensitive to sub-surface voids). In some examples, multivariate linear regression is used to determine the optimum frequency. In other examples, other rubrics may be used to find the optimum frequency such as a sigmoidal function, logarithmic regression, or exponential regression. Once an optimum frequency is found, that optimum frequency may be used to detect sub-surface voids in the sample 108 by using the method of FIG. 3.

It should now be understood that embodiments described herein are directed to systems and methods for detecting sub-surface voids and defects in power electronics modules. A probe having a dither and a receiver may emit ultrasonic waves from the dither as the probe is moved from a bulk distance from a sample to a near-surface distance from the sample. The receiver may receive reflections of the ultrasonic waves and the shear force amplitudes of those reflections may be measured as the probe is moved from the bulk distance to the near-surface distance. An approach curve may then be created by plotting the shear force amplitudes vs. the distance from the probe to the sample. The slope of the approach curve may be measured and a determination as to whether a sub-surface void exists at a point on the sample below the probe may be made based on the slope.

Embodiments described herein are also directed to systems and methods for determining an optimum frequency for detecting sub-surface voids. In one embodiment, approach curves may be created using a plurality of frequencies at one or more points on a sample and the frequency that is most sensitive to sub-surface voids may be selected as the optimum frequency. In other embodiments, a machine learning algorithm may be used to determine the optimum frequency for detecting sub-surface voids.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of detecting sub-surface voids in a sample:
    positioning a probe adjacent to a first point on the sample;
    emitting an ultrasonic wave from the probe towards the sample;
    moving the probe towards the sample;
    measuring a shear force amplitude of a reflection of the ultrasonic wave at the probe as the probe moves towards the sample;
    creating an approach curve by plotting the measured shear force amplitude of the reflection of the ultrasonic wave as a function of a distance between the probe and the sample; and
    determining whether a sub-surface void exists at the first point on the sample based on a slope of the approach curve.

2. The method of claim 1, wherein the probe comprises a glass electrode.

3. The method of claim 1, wherein the probe comprises a dither to emit ultrasonic waves and a receiver to detect reflected ultrasonic waves.

4. The method of claim 1, wherein the ultrasonic wave has a frequency that is sensitive to sub-surface voids in the sample.

5. The method of claim 1, wherein the slope of the approach curve is lower when a sub-surface void exists at the first point on the sample compared to when a sub-surface void does not exist at the first point on the sample.

6. The method of claim 1, further comprising:
determining an optimum frequency to which sub-surface voids are most sensitive; and
emitting the ultrasonic wave at the optimum frequency.

7. The method of claim 6, wherein determining the optimum frequency to which sub-surface voids are most sensitive comprises:
positioning the probe a first distance away from the sample at one or more points above the sample;
emitting first ultrasonic waves towards the sample at a plurality of frequencies at each of the one or more points above the sample;
measuring a bulk shear force amplitude of reflection of the first ultrasonic waves at the probe for each of the plurality of frequencies at each of the one or more points above the sample at the first distance;
positioning the probe a second distance away from the sample at each of the one or more points above the sample, wherein the second distance is less than the first distance;
emitting second ultrasonic waves towards the sample at the plurality of frequencies at each of the one or more points above the sample;
measuring a surface shear force amplitude of reflection of the second ultrasonic waves at the probe for each of the plurality of frequencies at each of the one or more points above the sample at the second distance;
comparing the bulk shear force amplitude to the surface shear force amplitude for each of the plurality of frequencies at each of the one or more points above the sample; and
determining the optimum frequency from among the plurality of frequencies based on the comparison between the bulk shear force amplitude and the surface shear force amplitude for each of the plurality of frequencies at each of the one or more points above the sample.

8. The method of claim 7, wherein determining the optimum frequency comprises:
determining a difference between the bulk shear force amplitude and the surface shear force amplitude for each of the plurality of frequencies at each of the one or more points above the sample;
determining a maximum difference among the differences between the bulk shear force amplitude and the surface shear force amplitude for each of the plurality of frequencies at each of the one or more points above the sample; and
selecting as the optimum frequency a frequency among the plurality of frequencies corresponding to the maximum difference.

9. The method of claim 7, where the first distance is greater than 1 micron and the second distance is less than 1 micron.

10. A method comprising:
positioning a probe adjacent to a plurality of points of a sample at a first distance from the sample;
emitting a first plurality of ultrasonic waves at a plurality of frequencies from the probe towards the sample at each of the plurality of points adjacent to the sample at the first distance;
measuring bulk shear force amplitudes of reflection of each of the first plurality of ultrasonic waves at the probe for each of the plurality of points adjacent to the sample at the first distance;
repositioning the probe adjacent to the plurality of points of the sample at a second distance from the sample, wherein the second distance is less than the first distance;
emitting a second plurality of ultrasonic waves at the plurality of frequencies from the probe towards the sample at each of the plurality of points adjacent to the sample at the second distance;
measuring surface shear force amplitudes of reflection of each of the second plurality of ultrasonic waves at the probe for each of the plurality of points adjacent to the sample at the second distance;
computing an error value for each of the plurality of frequencies at each of the plurality of points by subtracting the surface shear force amplitude from the bulk shear force amplitude measured for each of the plurality of frequencies at each of the plurality of points;
determining a set of frequencies from the plurality of frequencies comprising a frequency that has a maximum error value for each of the plurality of points;
selecting a predetermined number of points from among the plurality of points to determine a set of selected points;
for each point among the set of selected points, creating an approach curve at that point using an associated frequency from the set of frequencies that has the maximum error value for that point;
for each point among the set of selected points, determining a slope of the approach curve at that point; and
determining, using a machine learning algorithm, an optimum frequency based on the slope of the approach curve at each point of the set of selected points.

11. The method of claim 10, wherein creating an approach curve at a point on the sample comprises:
positioning the probe adjacent to the point on the sample;
emitting an ultrasonic wave at the associated frequency for the point from the probe towards the sample;
moving the probe towards the sample;
measuring a shear force amplitude of a reflection of the ultrasonic wave at the probe as the probe moves towards the sample; and
plotting the measured amplitude of the reflection of the ultrasonic wave as a function of a distance between the probe and the sample.

12. The method of claim 10, further comprising establishing scan limits prior to positioning the probe adjacent to the plurality of points of the sample at the first distance from the sample, wherein the scan limits comprise one or more of:
a limited portion of the sample to be measured for sub-surface voids; and
a minimum distance to keep the probe away from the sample;
wherein the scan limits are determined based on known characteristics of the sample.

13. The method of claim 10, wherein repositioning the probe adjacent to the sample at the second distance from the sample comprises:
moving the probe from the first distance away from the sample towards the sample;

measuring an ionic current between the probe and the sample as the probe is moved towards the sample using scanning electrode chemical microscopy; and stopping movement of the probe when the ionic current is a predetermined value.

14. The method of claim 10, wherein the machine learning algorithm comprises multi-variate linear regression.

15. The method of claim 10, wherein the plurality of frequencies comprises a sweep of frequencies within a predetermined range.

16. The method of claim 15, wherein the predetermined range comprises frequencies between 100 kHz and 900 kHz.

17. The method of claim 10, further comprising, after determining the set of frequencies from the plurality of frequencies comprising the frequency that has the maximum error value for each of the plurality of points, arranging the set of frequencies in descending order.

18. The method of claim 10, further comprising:

for one or more points on the sample, creating an approach curve at each of the one or more points using the optimum frequency;

for each point among the plurality of points, determining a slope of the approach curve at that point; and determining whether there is a sub-surface void at each of the plurality of points based on the slope of the approach curve at each point.

19. The method of claim 18, wherein creating the approach curve at a point on the sample comprises:

positioning the probe adjacent to the point on the sample;

emitting an ultrasonic wave at the optimum frequency towards the sample;

moving the probe towards the sample;

measuring a shear force amplitude of a reflection of the ultrasonic wave at the probe as the probe moves towards the sample; and plotting the measured amplitude of the reflection of the ultrasonic wave as a function of the distance between the probe and the sample.

20. The method of claim 18, further comprising plotting a map of the sample;

wherein the map of the sample comprises an indication of which portions of the sample contain sub-surface voids based on the determination as to whether each of the plurality of points has a sub-surface defect.

* * * * *

UNITED STATES PATENT AND TRADEMARK OFFICE
CERTIFICATE OF CORRECTION

PATENT NO. : 11,193,913 B2
APPLICATION NO. : 16/778791
DATED : December 7, 2021
INVENTOR(S) : Shailesh N. Joshi, Vishnu Baba Sundaresan and Vijay Venkatesh Page 1 of 1

It is certified that error appears in the above-identified patent and that said Letters Patent is hereby corrected as shown below:

In the Specification

In Column 3, Line(s) 5, after "herein", insert --;--.

In Column 8, Line(s) 46, after "may", insert --be--.

In Column 9, Line(s) 46, after "There may be", delete "may be".

In Column 11, Line(s) 67, after "have", delete "a".

Signed and Sealed this
Twenty-second Day of February, 2022

Drew Hirshfeld
*Performing the Functions and Duties of the*
*Under Secretary of Commerce for Intellectual Property and*
*Director of the United States Patent and Trademark Office*